May 25, 1937.  A. C. ROUTH  2,081,282
APPARATUS FOR FORMING UNIT PORTIONS OF ICE CREAM OR THE LIKE
Filed July 16, 1936  2 Sheets-Sheet 1
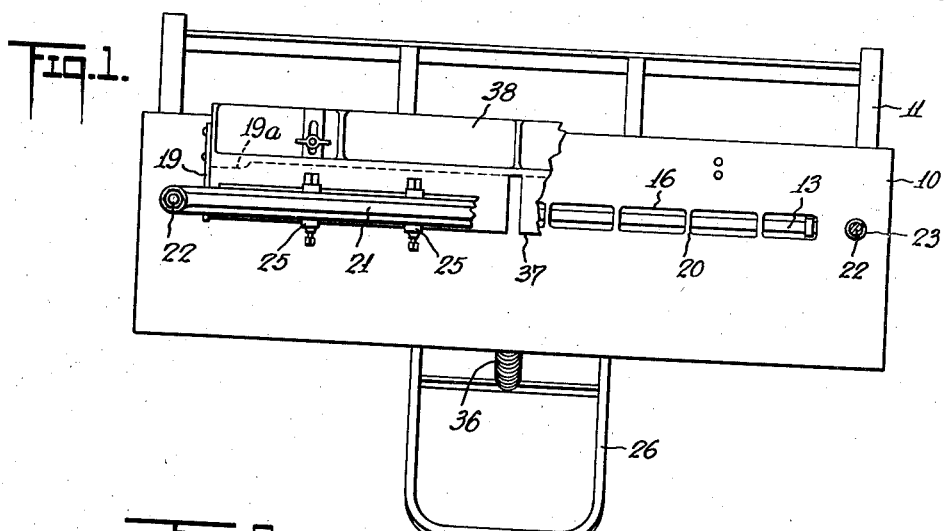
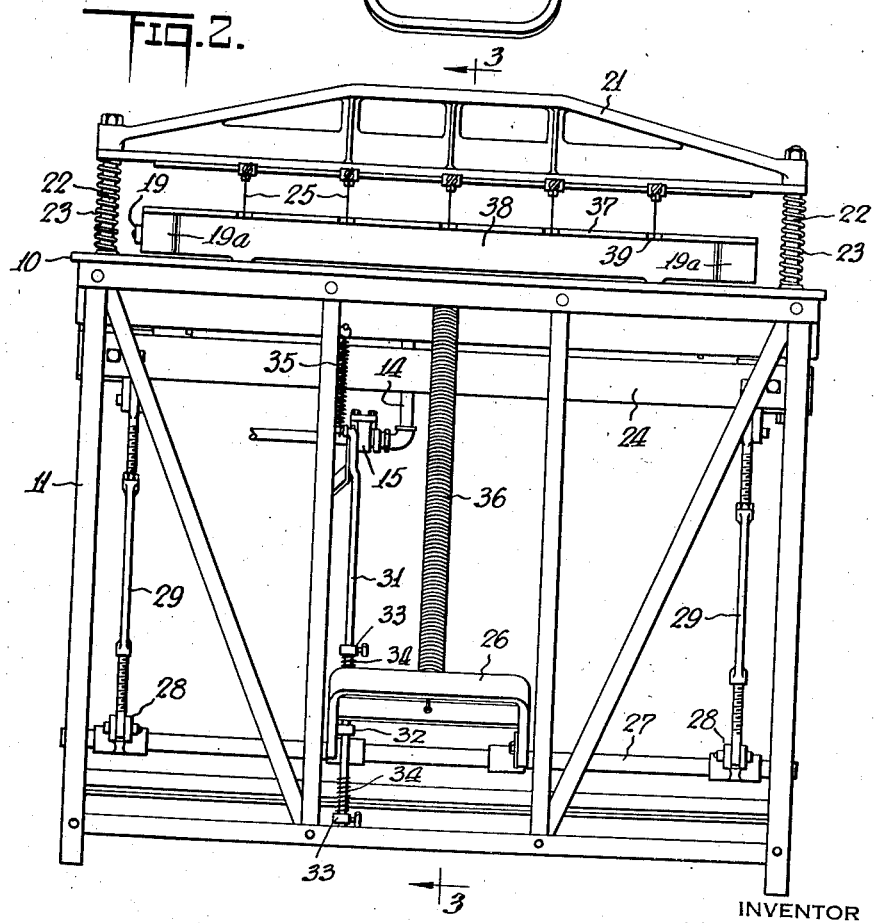
INVENTOR
Almond C. Routh
BY
ATTORNEYS May 25, 1937.  A. C. ROUTH  2,081,282
APPARATUS FOR FORMING UNIT PORTIONS OF ICE CREAM OR THE LIKE
Filed July 16, 1936   2 Sheets-Sheet 2
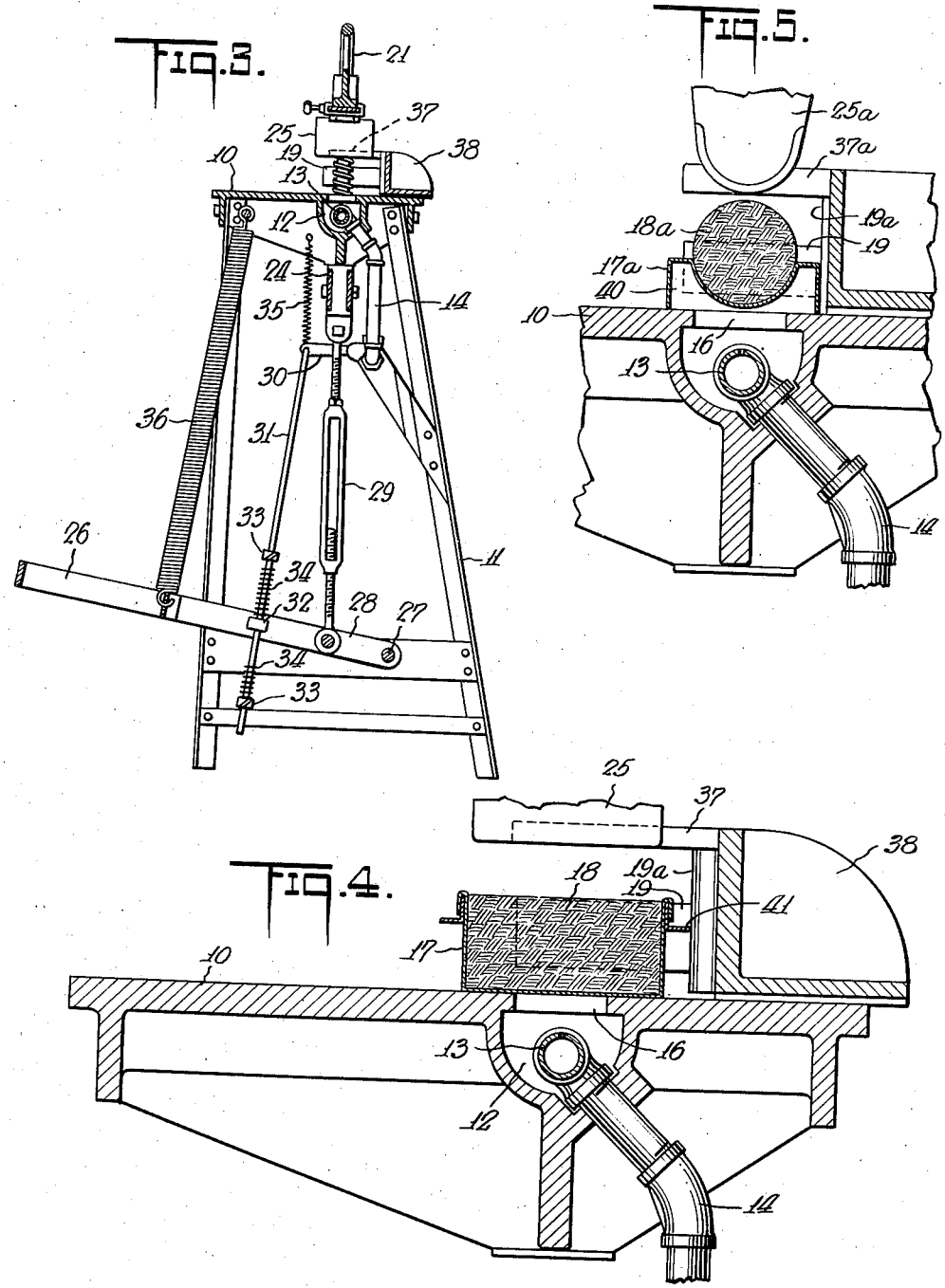
INVENTOR
Almond C. Routh
BY
ATTORNEYS Patented May 25, 1937

2,081,282

UNITED STATES PATENT OFFICE 2,081,282

APPARATUS FOR FORMING UNIT PORTIONS OF ICE CREAM OR THE LIKE

Almond C. Routh, Sandusky, Ohio, assignor, by mesne assignments, to The Girdler Corporation, Louisville, Ky., a corporation of Delaware Application July 16, 1936, Serial No. 90,957

10 Claims. (Cl. 107—21)

In a known method of manufacture of unit portions of ice cream, water ice, sherbet and the like, the mix with the desired air incorporated therein is frozen in a freezer which delivers the partially frozen ice cream in the form of a bar of such hardness or stiffness as to be form-retaining. The bar is cut into long sections, delivered to a hardening room where the sections are further frozen and hardened, and then removed from the hardening room and cut into unit portions. To facilitate handling from the time the bar is extruded from the freezer until it is desired to cut the bar into unit sections, it is customary to extrude the bar over and into a series of metal trays, each receiving a bar section of a length equal to the tray. During the further freezing in the hardening room the ice cream becomes frozen to the wall of the tray, so that heating is required to liberate the bar and permit its removal from the tray.

In commercial manufacture it is important that the unit portions be wrapped or packaged and returned to the hardening room as promptly as possible, to prevent undue warming and softening, and it is important that the amount of handling of the bar or the unit portions, between the time of removal from the hardening room and the return to the same or other low temperature chamber for storage, be reduced to the minimum. It is also important that there be the minimum amount of heating to free the bar or the portions from the tray.

The present invention relates to an improved apparatus for forming the unit portions from the bar. These unit portions may be individual service portions of a form and character adapted for consumption in an ice cream cone or in a sundae or soda water, or for service on a plate, or they may be of larger size such as pint or quart bricks.

In my improved apparatus I provide means whereby the bar sections may be cut into units while in the tray and thawed loose from the tray, so that upon inverting the tray the unit portions will be discharged ready for wrapping or packaging.

In a preferred form of the apparatus there is provided a table, platform or other support upon which the tray containing the frozen bar may be placed, and means are provided whereby the operator, by a single manipulation of a moving part, may apply the necessary heat to thaw the bar loose from the tray, and may operate the cutters to subdivide the bar into units.

In the accompanying drawings there is illustrated a commercial form of an embodiment of my invention. In these drawings:

Fig. 1 is a top plan view of the apparatus, portions thereof being broken away.

Fig. 2 is a front elevation.

Fig. 3 is a vertical section taken on the line 3—3 of Fig. 2, and

Figs. 4 and 5 are sections similar to a portion of Fig. 3, but on a larger scale, and showing alternative forms of trays, bars and cutting blades.

In the form illustrated the apparatus includes a platform, table or the like 10, which may be supported at a convenient height by any suitable form of frame, standard or base 11. The table is provided with a steam chamber 12 extending lengthwise thereof, and within which is disposed a steam pipe 13 with openings along the length thereof for the discharge of the steam. The pipe 13 is connected to a suitable source of steam supply by a pipe 14 in which is mounted a control valve 15. The table is provided with a slot 16 along the length of the chamber 12, and over which the tray 17 with its ice cream bar 18 may be placed. This slot, instead of being a continuous one, may be formed as a series of elongated holes with intermediate connecting portions 20 between opposite sides of the slot, to prevent the edge of the tray from entering the slot when bringing it into operative position.

Suitable means are provided on the table for insuring the accurate positioning of the bar over the slot 16. For instance, there may be an end stop 19 and rear stops 19a.

Mounted above the table is a blade carrier 21 in the form of a bar or frame extending lengthwise of the table and directly above the slot 16. This carrier is mounted on a pair of guide rods 22 at opposite ends of the table, and vertically movable to raise and lower the blade carrier. The guide rods 22 may be provided with coil springs 23 normally acting to hold the blade carrier in raised position. The guide rods beneath the table are connected to a transverse frame member 24 which may be vertically movable in guideways on the main supporting frame 11.

The blade carrier is so formed that a plurality of blades 25 may be detachably and adjustably secured to the under side thereof, so as to depend therefrom. These blades may be spaced apart to distances equal to the desired length of the unit portions to be cut from the bar, and the size and shape of the blades should be such as will substantially correspond to the cross-sectional area of the tray so that when the blades are lowered into the tray they will completely sever the bar at the desired points along the length of the latter.

In Fig. 4, I have illustrated a tray of substantially rectangular cross-section, and a blade 25 of corresponding shape.

In Fig. 5 the tray 17a has a substantially semi-cylindrical chamber adapted to receive the cylindrical ice cream bar 18a, and the blade 25a is of such shape that its lower end may be brought into engagement with the upper inner surface of the groove or chamber in the tray 17a.

For operating the blade carrier there is provided a lever 26, preferably in the form of a pedal mounted on the frame 11 adjacent to the lower end of the latter and projecting toward the front of the apparatus so that an operator, after placing the tray in position on the table, may readily operate the lever with his foot. This lever is secured to a rock shaft 27 which latter is connected to the cutter bar frame member 24 by a pair of lever sections 28 and links 29 adjacent to opposite ends of the apparatus. The links are preferably of such form that they may be varied in length to control the relative positions of the operating lever 26 and the blade carrier. For instance, each link may have terminal threaded portions connected by a turn buckle.

The valve 15 is provided with a valve lever 30 which is connected to the lever 26 by a link 31, so that upon depressing the lever 26 the steam valve will be opened in proper timed relationship to the lowering of the blades. The connection between the link 31 and the lever 26 is preferably such that a wide adjustment of timing may be obtained, for instance to turn on the steam only after the blades have approximately reached the limit of downward movement, or prior to the time the blades enter the bar, or at any intermediate time.

As shown, the link 31 extends through a guide 32 on the lever 26 and is provided with opposite adjustable collars 33, one above and the other below said guide, and between these collars and the guide there are provided coil springs 34. By proper adjustment of the collars 33 the position of the link in respect to the lever may be varied and lost motion may be permitted. Preferably the valve is normally held in closed position by a spring 35, and the foot lever 26 is held in raised position by a heavier coil spring 36.

In order to prevent the ice cream bar from being lifted out of the tray by the blades in case they stick to the blades after being thawed loose from the tray, there is preferably provided a stripper plate 37 mounted in a horizontal plane on a bracket 38 on the table 10 and projecting over the slot 16 at such an elevation that the tray may be readily slid beneath the stripper plate. This plate has slots 39 through which the blades 25 may extend.

If the apparatus be used only for making a predetermined length of unit the blades need not be adjustable and the slots 39 may correspond to the positioning of the blades. If it is desired to make a variety of different lengths of units there may be provided a plurality of interchangeable stripper plates, each with the proper spacing of slots, or there may be provided a stripper plate with a very large number of slots spaced to only slight distances apart, so that the blades may be adjusted to register with any desired combination of slots.

By means of my improved apparatus the tray containing the bar of frozen ice cream may, upon removal from the hardening room, be placed on the table 10, slid into proper position, and the foot lever lowered and almost instantly permitted to rise. Only a short quick blast of steam against the under side of the tray is sufficient to melt the ice cream loose, and the melting may be prior to, simultaneous with, or at the end of the cutting operation. The duration of the steam delivery may be varied not only by the positioning of the link 31 in respect to the foot lever 26, but may also be varied by the relative position of the valve lever 30 in respect to the valve ports, and by variation in the size of the ports. The steam may be delivered upward from the spray pipe 13 against the under side of the tray, or may be delivered laterally from both sides of the spray pipe, so as to give a more uniform distribution of the steam against the under side of the tray.

In the form shown in Fig. 5, the tray is formed with a chamber 40 in its under side which may receive the steam and insure a more uniform distribution of the steam over the entire surface to which the ice cream may be frozen. The chamber 40 extends along the sides of the bar so that when the tray is moved into position against the stops, the bar will be in proper position to receive the cutting blades. Where the tray is of rectangular form, as shown in Fig. 4, and without any such open bottom chamber, the side walls of the tray may be provided with flanges 41, one of which will engage the back stops 19a and thereby insure proper positioning of the ice cream bar in respect to the blades. The bracket 38 is preferably adjustable toward and from the slot 16, as shown in Fig. 1, and carries both the end stop 19 and the back stops 19a. The bracket may be non-adjustable, and the stops adjustable or interchangeable.

By means of the apparatus illustrated, a very great saving in time and manual operations is effected. The tray removed from the hardening room may be placed on the table, slid back against stops 19a and endwise against the stop 19, and the lever 26 depressed. Upon releasing the lever the tray may be removed and inverted to discharge the separate unit sections upon another table, where they may be quickly wrapped or packaged.

Although the invention in the form illustrated is primarily adapted for use with frozen comestibles, it will be obvious that it may be employed in connection with any plastic material which may be softened or partially melted by the application of heat to free it from its container.

Although steam is preferred as the heating medium for rapidly raising the temperature of the container to free the bar, it will be obvious that other heating media, such as hot water, hot gases, or electric current may be employed under some circumstances.

A single operating member for controlling the application of the heating medium and the operation of the cutting blades is desirable, although with some plastic materials, or under some circumstances, it may be satisfactory to provide separate means for controlling these two operations.

Having thus described my invention, what I claim as new and desire to secure by Letters Patent is:

1. An apparatus of the class described, including a support for a tray having therein a bar of plastic material, means for heating the tray to loosen said bar, and means for subdividing the bar into unit sections while in said tray.

2. An apparatus for forming unit sections from a bar of plastic material in a tray, said apparatus including a support for the tray, means carried by said support for heating the tray, and means also carried by said support and adapted to enter the tray to subdivide the bar into sections.

3. An apparatus for forming unit sections from a bar of plastic material in a tray, said apparatus including a support having a chamber provided with an open top adapted to be closed by said tray, means for delivering a heating medium to said chamber, and a cutter member disposed above said support and adapted to enter said tray to subdivide the bar therein.

4. An apparatus for forming unit sections from a bar of plastic material in a tray, said apparatus including a support having a chamber provided with an open top adapted to be closed by said tray, means for delivering a heating medium to said chamber, a blade carrier disposed above said support and extending lengthwise thereof, and provided with a plurality of cutting blades, and means for raising and lowering said blade carrier to bring the blades into and out of said tray.

5. An apparatus for forming unit sections from a bar of plastic material in a tray, said apparatus including a support for the tray, an operating member, means controlled by said operating member for heating the tray, and means also controlled by said operating member for subdividing into sections the bar in the tray.

6. An apparatus for forming unit sections from a bar of plastic material in a tray, said apparatus including a support having a chamber extending lengthwise thereof and open at the top, and adapted to be covered and closed by said tray, a spray pipe within said chamber, a valve for controlling the delivery of heating medium to said spray pipe, a plurality of cutters disposed above said support and movable into and out of said tray, and operating mechanism connected to said valve and to said cutters.

7. An apparatus of the class described, including a table adapted to support a tray containing a bar of frozen comestible, a spray pipe carried by said table and adapted to deliver heating medium to a wall of said tray along the length of the latter, a cutter bar disposed above said table and vertically movable in respect thereto, and provided with a plurality of depending blades, and means for positioning the tray in respect to said cutter bar and said spray pipe.

8. An apparatus of the class described, including a table adapted to support a tray containing a bar of frozen comestible, a cutter bar mounted above said table and extending lengthwise thereof, a steam pipe mounted beneath said table and extending lengthwise thereof, a valve for controlling the supply of steam to said steam pipe, a foot lever, and means connected to said lever for operating said cutter bar and said valve in timed relationship.

9. An apparatus of the class described, including a table adapted to support a tray containing a bar of frozen comestible, a cutter bar mounted above said table and extending lengthwise thereof, a steam pipe mounted beneath said table and extending lengthwise thereof, a valve for controlling the supply of steam to said steam pipe, a foot lever, means connected to said lever for operating said cutter bar and said valve in timed relationship, and means normally tending to hold said valve in closed position and said cutter bar in raised position.

10. An apparatus of the class described, including a table adapted to support a tray containing a bar of frozen comestible, a cutter bar mounted above said table and extending lengthwise thereof, a steam pipe mounted beneath said table and extending lengthwise thereof, a valve for controlling the supply of steam to said steam pipe, a foot lever, means connected to said lever for operating said cutter bar and said valve in timed relationship, and means for adjusting said connections to vary the timing of valve and cutter bar operations.

ALMOND C. ROUTH.